April 16, 1940.    G. E. REINKER    2,197,562
MOLDED GLASS ARTICLE
Filed Dec. 21, 1937

Inventor:
Gerald E. Reinker,
by Harry E. Dunham
His Attorney.

Patented Apr. 16, 1940

2,197,562

UNITED STATES PATENT OFFICE 2,197,562

MOLDED GLASS ARTICLE

Gerald E. Reinker, Cleveland, Ohio, assignor to General Electric Company, a corporation of New York Application December 21, 1937, Serial No. 181,015

1 Claim. (Cl. 49—92)

My invention relates to molded glass articles of the type made from powdered glass, and to a method for manufacturing the same. More particularly, my invention relates to that type of molded glass article produced by fritting a pressed mass of powdered glass. The process of my invention is especially adapted to the manufacture of electrical insulators of various types, such as the insulation button in electric lamp bases and the disc insulator in mercury switches.

In the known methods of manufacture of fritted glass articles, the molded article very often warps or squats out of shape during the firing operation, and as a result becomes unfit for its intended use. Such a disadvantage obviously increases the cost of production, due to the many rejected articles. Even where the article, though warped, may still be satisfactory for its intended use, the result is an inferior product.

One object of my invention is to provide a pressed powdered glass article of such a composition as not to warp or squat out of its molded shape during subsequent firing operations.

Another object of my invention is to provide a pressed glass article of two different glass compositions having different melting points whereby the said article will not warp or squat out of its molded shape during subsequent firing operations.

Still another object of my invention is to provide a pressed glass body of such a composition as to produce, upon firing thereof, a dense vitreous article of zero moisture absorption.

A further object of my invention is to provide a pressed glass article which will readily wet to metal at low temperatures, so as not to become distorted during the heating operation necessary to effect a seal between such a glass article and a metallic member.

A still further object of my invention is to provide an improved method for the manufacture of fritted glass articles whereby warpage of such articles is prevented.

Figure 1:
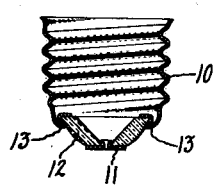
Figure 2:
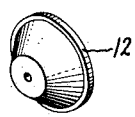
Figure 3:
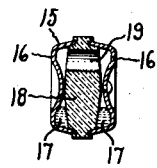
Figure 4:
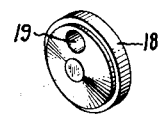

Further objects and advantages of my invention will appear from the following description of a species thereof and from the accompanying drawing, in which, Fig. 1 is a longitudinal sectional view of an electric lamp base provided with a molded glass insulation button made according to my invention; Fig. 2 is a perspective view of the glass insulation button shown in Fig. 1; Fig. 3 is a sectional view of a conventional mercury switch provided with a molded glass disc insulator made according to my invention; and Fig. 4 is a perspective view of the disc insulator shown in Fig. 3.

Referring to the drawing, Fig. 1 illustrates a conventional lamp base comprising a metallic base shell 10, a metal eyelet 11, and glass insulation 12. The said insulation consists of a preformed glass button made according to my invention, and is secured to the shell 10 by means of an inturned flange 13 which is rolled or peened over the peripheral edge of the button.

The improved method for manufacturing the glass buttons 12 involves the use of two different glasses having different melting or fusion points, i. e., one having a relatively high and the other a relatively low melting point. The higher melting point or hard glass may be any ordinary glass, such as bottle glass, or the glass commonly employed in the manufacture of lamp bulbs. A typical analysis of such a high melting point glass is as follows:

| | Per cent |
|---|---|
| $SiO_2$ | 72.6 |
| $Na_2O$ | 17.20 |
| $Al_2O_3$ | 0.82 |
| $CaO$ | 5.32 |
| $MgO$ | 3.58 |
| $K_2O$ | 0.48 |

Although it is not necessary, the lower melting point or soft glass preferably should be one having substantially the same expansion coefficient as the higher melting point glass. A typical analysis of a suitable soft glass is as follows:

| | Per cent |
|---|---|
| $SiO_2$ | 30.0 |
| $PbO$ | 53.0 |
| $B_2O_3$ | 11.0 |
| $Na_2O$ | 5.0 |
| $CaO$ | 1.0 |

The two different glass compositions are separately ground to a powdered form, the hard glass being ground to a relatively coarse grain size of preferably 30 mesh, and the soft glass being ground to a relatively fine grain size of preferably 200 mesh. The respective grain sizes of the two powdered glasses may be varied considerably, however, without sacrificing the advantages of my improved process. The two powdered glass compositions are mixed together preferably in the proportions of 60 to 90 per cent of the hard glass and 10 to 40 per cent of the soft glass. This powdered intermixture is next pressed, either with or without a suitable binder such as wax, into the desired shape; in this instance in the shape of the glass insulator button shown in Fig. 1. The pressed shape is then fired at a temperature which will melt the softer glass but not the hard glass. The result is a product which is very strong and which has some of the characteristics of a solid glass article. The particles of the hard glass are substantially unfused and are agglomerated by the fused particles of the soft glass.

For the specific glass compositions given above, the firing temperature should be between 600 and 700° C. The exact temperature, however, may be varied between these limits depending upon the degree of hardness desired in the finished article.

Since the pressed glass mixture is fired at a temperature below the melting point of the hard glass, the latter is not affected by the heat attending such firing operation and accordingly retains its original molded shape. As a consequence, the original molded shape of the entire pressed glass body is maintained, so that warpage thereof is effectively prevented.

Fig. 3 illustrates a conventional mercury switch commonly employed to make and break electrical circuits. The switch comprises a housing 15, consisting of a pair of metallic cup-shaped members 16, 16, and a quantity of mercury 17 contained therein. The two metallic cups 16, 16 are electrically insulated from each other by a septum or disc insulator 18, which divides the mercury 17 into two separate pools when the switch is in the off position, as shown in Fig. 3. The metallic cups are united to the disc insulator by embedding the rims of said members in the said disc insulator. The disc insulator 18 is provided with an offset opening or passageway 19 to permit the mercury 17 to flow therethrough when the switch is rotated to its closed position, thereby connecting the two pools of mercury and completing the electrical circuit between the two metallic cup members 16, 16. The disc insulator 18 may be advantageously made according to the process of my invention described hereinabove.

A disc so made readily wets to metal at a relatively low temperature. Thus a tight seal between the metallic cups 16, 16 and such a disc 18 may be obtained without distortion of the said disc.

Mercury switches provided with disc insulators made according to my invention can be operated at higher amperages and voltages than one provided with a conventional ceramic disc insulator of magnesium oxide and clay. This is due to the greater dielectric strength of a disc insulator as made by my improved process.

Where the particular article to be made must be especially heat-resistant, a high heat-resistant glass, such as that commercially known as Pyrex, may be used as the hard glass composition. The result is a product which can withstand severe thermal shocks.

By the above-described process, small articles can be made at a very low cost, especially those which can be pressed on high-speed machines such as the pill-making machines commonly employed in the manufacture of glass beads for electric miniature lamps. Thus, it is entirely possible to make the above referred to glass insulator buttons 12 and disc insulators 18 on pill-making machines at the rate of approximately 700 per minute.

The process of my invention is admirably suited to the manufacture of various decorative articles such as ash trays and the like, in which case the finished article may be glazed, if desired, to thereby provide a better finish.

What I claim as new and desire to secure by Letters Patent of the United States is:

A molded glass article consisting of a compressed intermixture of two powdered glasses having different fusion points but substantially the same coefficient of expansion, the higher fusion point glass particles being substantially unfused and agglomerated by fused particles of the lower fusion point glass, the article having a dense impervious structure.

GERALD E. REINKER.